Figure 1:
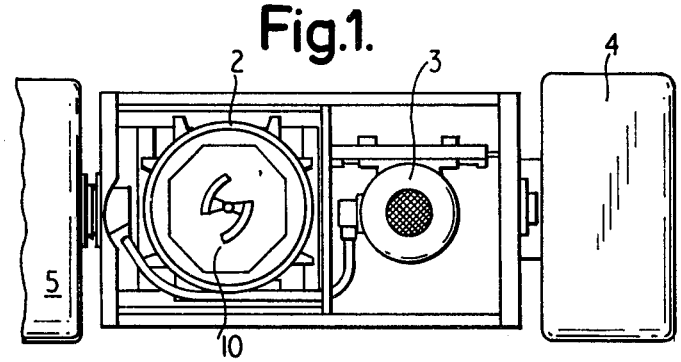

United States Patent [19]

Ball

[11] Patent Number: 4,465,700
[45] Date of Patent: Aug. 14, 1984

[54] DOUGH MIXING FOR FARINACEOUS FOODSTUFF PRODUCTION

[75] Inventor: Kenneth M. J. Ball, Merseyside, England

[73] Assignee: Tweedy of Burnley Limited, Burnley, England

[21] Appl. No.: 487,303

[22] Filed: Apr. 21, 1983

[51] Int. Cl.³ .............................................. A21D 13/08
[52] U.S. Cl. ..................................... 426/504; 426/19; 426/524; 366/69
[58] Field of Search ................ 426/19, 496, 504, 524; 366/69

[56] References Cited

U.S. PATENT DOCUMENTS 4,368,209  1/1983  Tomlinson .......................... 426/504
4,369,193  1/1983  Collins .............................. 426/504

Primary Examiner—R. B. Penland
Assistant Examiner—Elizabeth A. Hatcher
Attorney, Agent, or Firm—Quaintance & Murphy

[57] ABSTRACT

Dough mixing for the production of farinaceous foodstuffs, in which the energy added in mixing is sufficient to determine the cell structure. There are four essential conditions: the energy added in mixing is not less than 10 (and preferably not less than 15) watt hours per kilogram of the total ingredients; the mixer is cooled by passing a fluid through a jacket surrounding the mixing chamber, and at least some of the water ingredient required to make the dough is added part-way through the mixing process, and at least part of the mixing is carried out under vacuum conditions.

16 Claims, 9 Drawing Figures

DOUGH MIXING FOR FARINACEOUS FOODSTUFF PRODUCTION

The present invention is concerned with the production of relatively low density soft bread such as that commonly produced by the medium and large sized bakeries in the United States of America, using a so-called "no time" dough. A "no time" dough can generally be defined as a dough which is not a sponge, but which does not require any or any substantial fermentation in bulk.

In England, successful production of no time dough was achieved by the Flour Milling and Baking Research Association at Chorleywood in 1961 and it was shown that the process was essentially controlled by the energy input to the dough during mixing which has to be approximately 11 watt hours per kilogramme weight of the total ingredients and that this energy must be added within 5 minutes. (See report No: 59 of the British Baking Industries Research Association, Chorleywood). This is referred to hereinafter as "the Chorleywood bread process".

Even with the Chorleywood bread process problems of texture still arose in connection with the type of bread marketed by large bakeries in England in 1962, and it was eventually found to be necessary to mix the dough under vacuum conditions to meet the texture requirements of the market. (See British Pat. No.: 1,035,314—K. Pickles).

The Specification of U.S. Pat. No. 4,369,193 (Tomlinson et al) describes a method of mixing dough for use in the production of soft bread having a specific volume of about 4.5 to 7.0 cubic centimeters per gramme and wherein energy added during mixing is sufficient to determine the cell structure of the finished product, the dough, not being a sponge, requiring substantially no fermentation in bulk following mixing comprising the steps of: mechanically mixing the dough in batches; imparting energy to the dough by said mixing step in a quantity in excess of 15 watt hours per kilogramme of total dough ingredients; controlling the temperature rise in the dough resulting from energy input during said mixing step, by passing a fluid coolant about said chamber, externally thereof and in contact therewith, so that the temperature of the dough after mixing is within the range of 25° C. to 35° C., and inducing a vacuum in the chamber during at least a portion of said mechanical mixing step. This method has been used successfully, but there are problems, particularly when the ambient temperature of the bakery is relatively high.

An improved method of mixing dough for use in the production of soft bread is described in the specification of U.S. Pat. No. 4,368,209 (Tomlinson). According to that specification a method of mixing dough for use in the production of bread having a specific volume of about 4.5 to 7.0 cubic centimeters per gramme is similar to that of U.S. Pat. No. 4,369,193, excepting that at least one of the ingredients sugar and fat are added part way through the mixing process, but after at least 25% of the total mixing time in the mixing chamber.

It has now been discovered that bread of substantially the same quality as that made by the use of the method described in U.S. Pat. No. 4,368,209 can be made, if a similar dough mixing process is employed, excepting that, instead of, or in addition to, adding sugar and/or fat part way through the mixing process, at least some of the water ingredient is added part way through the mixing process.

Reference has been made above to bread as produced in the United States. For the purpose of this specification, such a bread can be defined as:

(a) bread made from the following essential ingredients in substantially the proportions indicated (percentages are by weight):

| American flour containing 11–13% protein 100% | |
|---|---|
| Salt | 1.7–2.5% |
| Water | 58–68% |
| Yeast | 1.5–5.0% |
| Fat | 1.0–8.0% |
| Sugar | 2.0–10.0% |
| Conditioners | 0.5–3.0% | and (b) having a specific volume of 4.5 to 7.00 cubic centimeters per gramme.

It is to be understood that the invention is not restricted to the production of bread of the kind which is consumed in the United States of America. There is evidence that the invention can be used to produce bread and other baked farinaceous foodstuffs of very good texture and flavour, but suited to the market in other countries (e.g. the United Kingdom, Germany, Australia).

According to this invention, a method of dough mixing for the production of farinaceous foodstuffs of the type in which the energy added during mixing is sufficient to substantially determine the cell structure of the finished product, and in which the dough (not being a sponge) requires substantially no fermentation in bulk, is characterised by the facts that: the energy added during mixing is not less than 10 watt hours per kilogramme of the total dough ingredients; the process is regulated by passing a fluid coolant through a jacket surrounding the mixing chamber so that the temperature of the dough mass after mechanical treatment is within the range 25° C. to 35° C., at least some of the water ingredient required to make the dough is added part way through the mixing process, and at least part of the mixing is carried out under vacuum conditions. Preferably the energy added to the dough by said mixing step is in excess of 15 watt hours per kilogramme of total dough ingredients.

Experience of the Chorleywood bread process in the production of English bread has shown that it is not necessary to vary the total energy input from the 11 watt hours per kilogramme figure by more than a few percent, and indeed the baker would attempt to keep the energy input to as low a figure as possible. Hence, when work commenced on the mixing of American type dough, it was not thought possible to make any substantial alteration in the total energy input, and even when experiments to increase energy input were made, these were initially only small increases showing no significant advantage. It was surprisingly found that one of the factors in achieving success, was the addition of a much higher energy input than 11 watt hours per kilogramme of the ingredients, during the total mixing process, and at first 15 watt hours was identified as the lower limit of success. Subsequent experiments have shown that by using the method of the present invention, in some instances the energy input can be reduced to 10 watt hours per kilogramme of the ingredients though it is still preferred to add in excess of 15 watt hours per kilogramme of the ingredients. The total mixing process may be carried out in a mixing chamber, or mainly in a mixing chamber and partly in some other apparatus, such as a dough pump.

The previous work by Tomlinson (U.S. Pat. No. 4,368,209) has shown that better results are achieved (or the same results can be achieved more easily) if the ingredients sugar and/or fats are added part way through the mixing process.

It has now been discovered that at least as good results are achieved if at least some of the water ingredient required to make the dough is added part way through the mixing process. It is suggested that delaying the addition of the water increases the energy input during the initial part of the dough mixing process (because there is greater friction in the dough and between the dough and the walls of the mixer due to the absence of water) thus increasing the development of the dough, but whatever the reason, better results are obtained if the addition of at least some of the water is delayed.

In some instances, it is preferable to delay the addition of at least one of the ingredients sugar and fats besides the water. In any event, it is preferred to delay the addition of at least 5% by weight of the total ingredients and this may be all water or water and sugar and/or fats. Preferably between 5% and 15% by weight of the total ingredients is added late. It is further preferred that any sugar and/or fat which is delayed is added in liquid form (i.e. syrup in the case of sugar).

It is also preferred that the water or water and sugar and/or fats which is or are delayed is or are added after at least 5% of the total mixing time in the mixing chamber. Preferably the delay is between 5% and 25% of the total mixing time in the mixing chamber.

The pressure in the mixing chamber may be reduced to between 550 TORR and 250 TORR.

Figure 2:
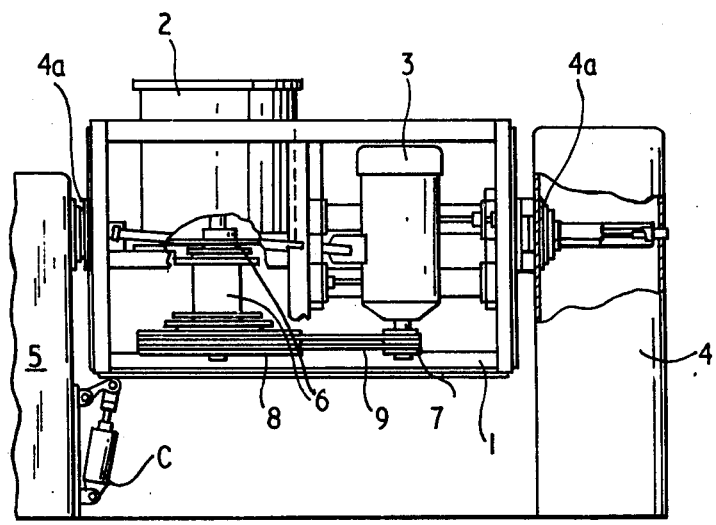
Figure 3:
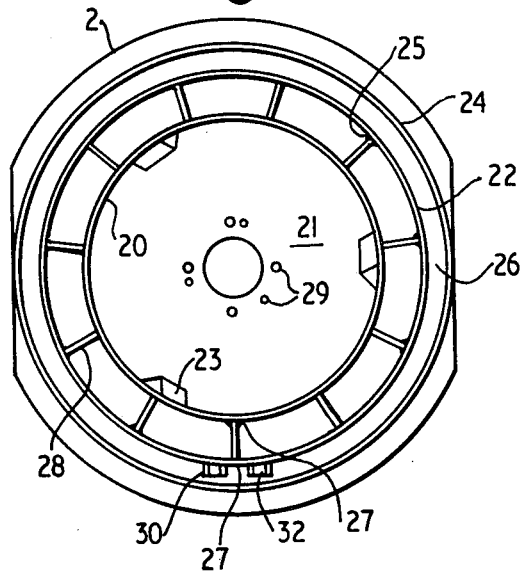
Figure 4:
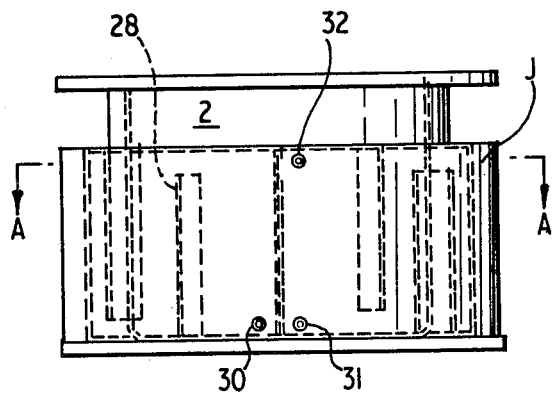
Figure 5:
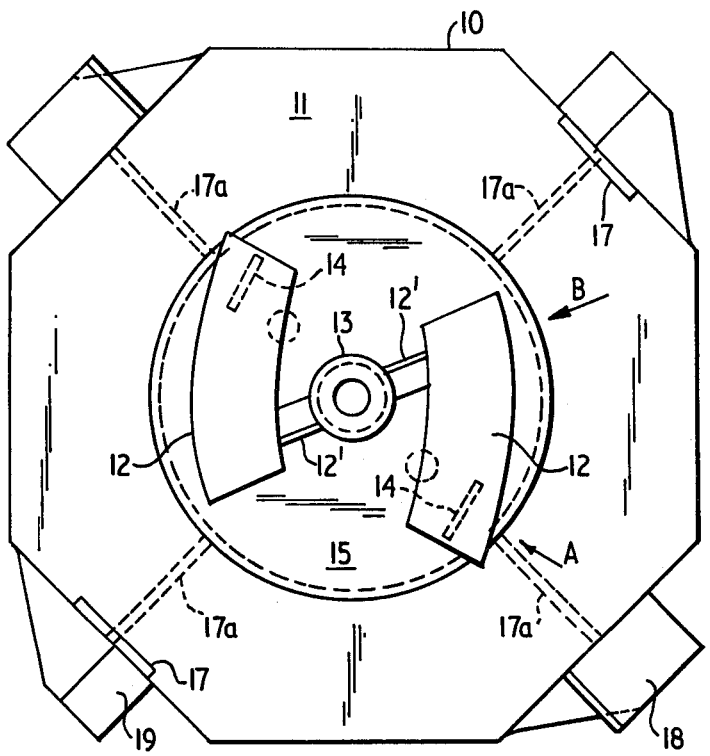
Figure 6:
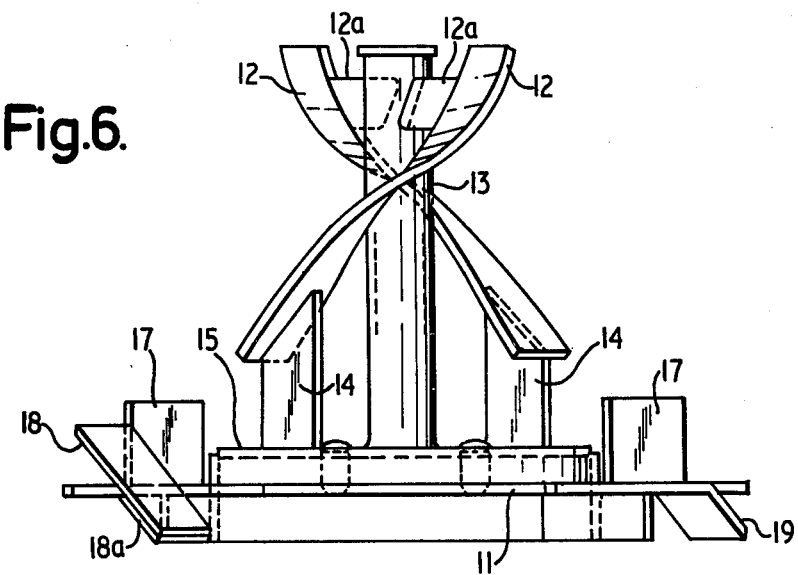
Figure 7:
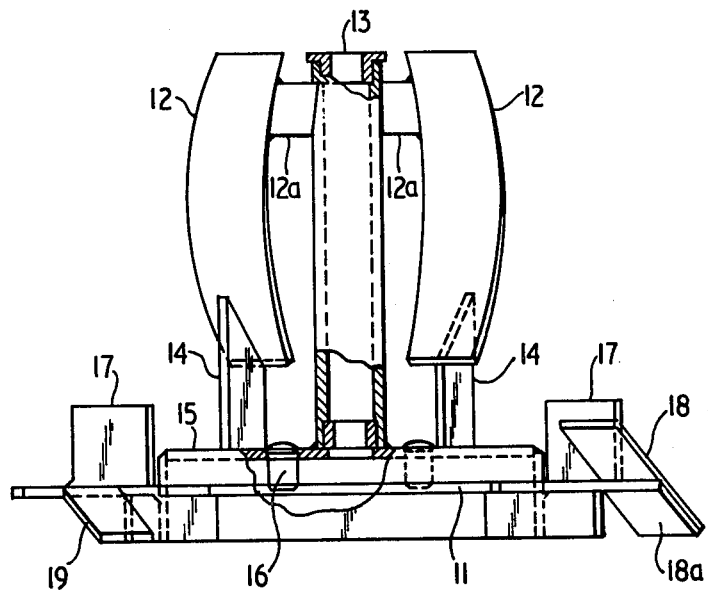
Figure 8:
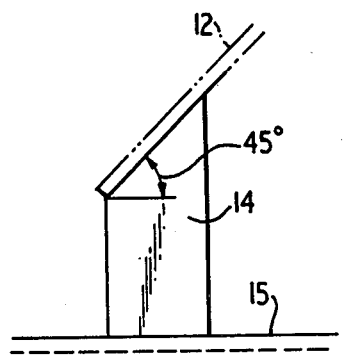
Figure 9:
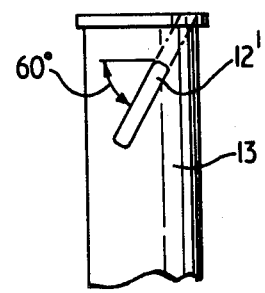

One form of mixing apparatus suitable for carrying out the process of the invention and its method of use will now be described by way of example only with reference to the accompanying drawings, in which:

FIG. 1 is a plan view of a mixing machine,

FIG. 2 is a front view of the mixing machine shown in FIG. 1, with a portion broken away, FIG. 3 is a cross-sectional view taken along the line A—A of FIG. 4, showing a mixing chamber which is a portion of the mixing machine, FIG. 4 is a side view of the mixing chamber shown in FIG. 3, FIG. 5 is a top view of a rotary mixing device, FIGS. 6 and 7 are side views of the device shown in FIG. 5, FIG. 8 is a front view of a vertical blade member ae viewed along the direction of the arrow A in FIG. 5, and FIG. 9 is a side view of the upper portion of a vertical shaft 13 as viewed in the direction of the arrow B of FIG. 5.

FIGS. 1 and 2 shows the overall arrangement of a mixing machine suitable for dough mixing according to the present invention. A mixing chamber 2 is supported by a machine frame 1, supported on bearing stands 4 and 5, there being journal bearings 4a located at each end of the frame. A mixing device 10 which will be hereinafter described in detail is located within the mixing chamber 2, and power for driving the mixing device 10 is provided by a motor 3, the drive being transmitted through a pulley 7a, a belt 9, and a wheel 8. The device 10 is supported by a bearing assembly 60, located directly below the centre of the chamber 2, so that it is adapted to rotate about a vertical axis. The machine also includes a ram-and-cylinder device C, which is adapted to tilt the entire frame 1 when the dough is to be discharged from the chamber 2 upon completion of a mixing and kneading operation.

FIGS. 3 and 4 illustrate the mixing chamber 2 in detail. The chamber has the form of an open-topped cylinder and comprises an inner shell 20 and a bottom wall 21, and is surrounded by a jacket 22 which is defined by the inner shell 20 and an outer shell 25, the jacket being enclosed within a heat insulating cylindrical mantle 24 accommodating a heat insulator 26. Baffle plates 28 extending axially of the chamber 2 are welded inside the jacket 22 between the inner and outer shells. A fluid inlet 30 and a fluid outlet 32 are provided in the outer shell 25 and alternate baffle plates extend, one from the bottom of the jacket to a position near to the top of the jacket (leaving a gap above the baffle plate and below the top of the jacket) and the other from the top of the jacket to a position near to the bottom (leaving a gap below the baffle plate and above the bottom of the jacket). If a temperature regulating fluid for cooling or heating is introduced into the jacket through the fluid inlet 30, the fluid will initially rise within the jacket and proceed from a gap at the upper portion of the jacket to a neighbouring compartment in which the fluid will descend, thereby allowing the fluid to flow uniformly up and down in regular succession within the jacket before finally being discharged from the fluid outlet 32. Designated at 31 is a drain port for attaching a drain cock. In this particular construction only the baffle plate between the inlet 30 and the outlet 32 is welded along both its side edges 27 and upper and lower ends so as to form a fluid-tight seal between the inlet 30 and the outlet 32. It is to be noted that the fluid is compelled to travel over an undulating path which is almost the full depth of the chamber 2.

FIGS. 5 to 9 depict a more detailed view of the rotary mixing device 10, which as shown, is mounted in the bottom portion of the mixing chamber 2. As illustrated in these drawings, a centre disc 15 having a vertical shaft 13 upstanding at its centre is secured to an approximately octagonally shaped rotary plate 11. Projecting outwardly from the upper part of the vertical shaft 13 and approximately perpendicular thereto is an arm 12a to which is fixed the upper portion of a mixing vane 12. The lower portion of the mixing vane 12 is fixed to a vertical blade member 14 upstanding from the centre disc 15. There may be provided a plurality of reinforcing ribs 17a on the lower face of the rotary plate 11, if necessary.

As can be more clearly seen in FIGS. 6 and 7, the mixing vane 12 in its upper portion points in the forward direction of rotation and has a wing-shaped configuration, the vane also including a curved portion which points downwardly. Arranged about the outer circumferential portion of the rotary plate 11 and spaced apart from each other substantially equi-angularly are a plurality of scraping vanes each composed of a circumferentially directed vertically extending small square plate or vane member 17, a small rectangular scraping vane member 18 fixed to a mounting 18a formed by bending down the edge portion of the rotary plate 11, and a scraping vane member 19 obtained by leaving the mounting plate 18a uncovered. The angle defined by the upper end of the vertical blade 14 and the plane of the mixing vane 12 is preferably about 45° as shown in FIG. 8, whilst the angle defined by the arm 12a and a line perpendicular to the axis of the vertical shaft 13 is preferably in the order of 60° as shown in FIG. 9. However, the magnitudes of these angles are not critical.

In the preparation of a bakery dough, the ingredients are placed in the mixing chamber 2, and are first pressed downwardly by the surface of the kneading vane 12, upon rotating the member 10 in the direction of the arrow as shown in FIG. 5. Since the vertical blade member 14 extends from the bottom surface of the vane 12 and points substantially in the direction of rotation, the dough which has been pressed down below the vane 12 is sectioned and then divided (cut and folded) on either side of the vertical blade member 14. In this way, the portion of the highly viscous dough that has been thrust radially outwards from the rotary member 10 is pulled and folded by the vertical vane member 17. Meanwhile the portion of the dough located closer to the centre of the tub is gradually thrust radially outwards while colliding with and piling on the portion pulled and folded as described above. The dough as it approaches the outer periphery of the rotary member is scraped up and down by the scraping vane members 18, 19 whilst being pressed between the deflecting member 23. However, just as the dough is being lifted it is once again pressed down and turned under by the mixing vane 12, after which the vertical blade 14 again sections the dough, so that the pulling, folding, colliding, piling, and scraping operations are repeated. Since the dough is thus repeatedly subjected to stretching and cutting actions resulting from a combination of powerful movements, the mixing, stirring and kneading operations are rapidly and uniformly carried out, thereby allowing complete mixing and kneading of the dough in a short period of time. Moreover, because of the various cutting and folding actions which take place for every revolution of the device 10, it is feasible to add a relatively large amount of energy to the dough in a short period.

The mixing chamber 2 is fitted with a lid (not shown) which is adapted to seal on to the rim of the chamber and there is also provided pumping means (not shown) for evacuating air from the interior of the chamber 2 when the lid is in the closed, sealing position. An inlet valve (not shown) is provided in the lid through which liquid ingredients such as liquid fats and sugar (syrup) can be fed into the chamber 2 after the lid has been closed and part way through the mixing operation if desired. There is also a water tank (not shown) on the machine frame, for the purpose of providing the necessary water supply for making the dough. A water supply valve is provided between the water tank and the mixing chamber so that it is possible to control the supply of water into the mixing chamber.

By using a mixing machine of the type shown in the drawings, it is possible to produce a dough which has attainted a highly developed glutinous state in a very short period of time. The air bubbles entrapped within the dough are dispersed and distributed finely and uniformly, and the dough exhibits excellent mechanical tolerance, namely resistance against breakage of the gluten network. In effect, it is possible to produce dough which has had sufficient energy added to it in the mixing machine, to determine the final cell structure of the finished baked product, and it is possible to avoid the conventional bulk fermentation step, which in some cases could take as long as four hours.

During a dough mixing process in the chamber 2, the dough temperature rises in proportion to the energy input, and if permitted to rise without control, the temperature would soon attain a level at which the dough could not be successfully turned into an acceptable product. However, the presence of cooling liquid in the jacket 22 retards the temperature rise of the ingredients, and consequently it is possible to avoid raising the dough to a temperature too high for subsequent processing. Obviously, chilled water could be used in the jacket 22, but in some instances, it is preferable to use ethylene glycol, or a halogenated hydrocarbon, which has a freezing point lower than that of water, so that the liquid coolant being pumped through the jacket, can be at a temperature less than 0.° C.

By use of this temperature control, it is possible to produce good dough in conditions where the ambient temperature is such that without the use of the jacket cooling method, it would be impossible to add the necessary energy to the dough in the mixer without overheating the dough. It is important that the cooling liquid should circulate vertically by approximately the depth of the rotary member 10, to ensure that the cooling effect of the jacket is adequate.

EXAMPLE I

Hamburger buns of the type commonly marketed in the United States of America were produced, having the following formulation:

| | |
|---|---|
| Flour | 100% |
| Salt | 2% |
| Yeast suspension | 9% |
| Fat | 5% |
| Sugar | 7% |
| Conditioners | 3% |
| Water | 55% |

The flour at a temperature of approximately 21° C. was placed in the mixing chamber 2 of a machine of the type described above with reference to the drawings, and to the flour were added the yeast in suspension, the dry ingredients and the remainder of the water. The water was supplied at a temperature of approximately 4° C., except for 0.5 kilogrammes which was supplied as ice. Some 10% of the water (i.e. approximately 3% of the total intredients) was not added at this stage. The mixing machine was then operated to mix the ingredients in the chamber by the method previously described, and at the same time air was evacuated from the chamber by the vacuum pumping system, down to a pressure of approximately 265 TORR.

When the machine had been in operation for 55 seconds, about 5 watt hours per kilogramme of the total dough ingredients had been added to the dough then forming in the mixing chamber. At that stage, the water which had been held back was added by opening the water supply valve. Mixing was then continued to a total time of about 3 minutes 50 seconds and by then approximately 21 watt hours per kilogramme of total dough ingredients had been added and the dough was fully mixed. The temperature of the dough at the end of mixing was about 31.5° C. and this is acceptable.

Throughout the mixing process ethylene glycol was passed through the water jacket 22 of the mixer at a pressure of approximately 0.7 kilogrammes per square centimeter and at a temperature of −6.7° C.

After mixing, the support frame 1 was tilted, and the dough dropped into a conventional hamburger bun trough, in which it was wheeled the length of the dough room at an ambient temperature of 16° C. to 21° C., before being dropped into the divider hopper. The transferring operation took approximately 3 minutes. The total quantity of dough (85 kilogrammes in the particular example) was then worked off through a dough moulder and panner into 4 inch hamburger buns which scaled at 0.82 kilogrammes per dozen. After leaving the panner, the buns were subjected to a conventional proving in a static proof box at 43° C. to 46° C. with 90% relative humidity. The proving time was 45 minutes.

The buns were then baked at 180° C. for 7½ to 8 minutes. The baking time could be varied of course, but the market which was being supplied by the particular test batch prefers a slightly pale bun. Following baking, the buns were cooled for 17 minutes and then sliced on a standard band slicer.

EXAMPLE II

American bread was manufactured using a dough mixer of the kind shown in the drawings, the bread having the following formulation:

|  | % | g/mix |
| --- | --- | --- |
| Flour (American, 11.5% protein) | 100 | 7000 |
| Salt | 2.0 | 140 |
| Water | 63 | 4410 |
| Yeast | 3.5 | 245 |
| Fat ("Covo", 43° C. slip point) | 3.0 | 210 |
| "Dairy Blend" | 2.0 | 140 |
| Sugar (sucrose) | 3.6 | 255 |
| Soya | 0.5 | 35 |
| SSL | 0.25 | 17.5 |
| Calcium propionate | 0.1 | 7 |
| Potassium iodate | 0.0020 | 0.14 |
| L-cysteube cysteube hydrochloride | 0.0045 | 0.315 |

Work input: 19 Wh/kg.
Mixer speed: 560 revolutions per minute.
Mixing time: 2 minutes 36 seconds.
Vacuum of 500 TORR.
Dough Temperature: 30.5° C.
Scaling weight: 525 grammes per piece.
First moulding into ball.
First proof: 8 minutes at ambient temperature.
Final moulding into cylinder to fit pan length.
Final proof: 60 minutes at 43° C. and about 80% Relative Humidity.
Proof height: 10 cms.
Baking: 18 minutes at 243° C.
Loaf volume: 2807 ml. Loaf specific volume: 6.22 ml/gramme.

The procedure was exactly the same as that described in Example I, including the late addition of some 10% of the water.

The quality of the bread was considered to be fully comparable with commercial American white bread.

It will be appreciated, that the above described examples are but specific instances of the manner in which the invention can be used. Obviously, different formulations can be used for different types of end product, and the procedure will be varied accordingly.

It has also been found possible to delay the addition of some or all of the sugar and/or fats besides the water. However, it is preferred that the total quantity of ingredients which are held back in this way (including the water) does not exceed 20% of the total ingredients used in the mix.

I claim:

1. A method of mixing dough for use in the production of bread having a specific volume of about 4.5 to 7.0 cubic centimeters per gramme, the dough comprising at least the ingredients flour, salt, yeast, sugar, conditioners and water, and wherein energy added during mixing is sufficient to substantially determine the cell structure of the finished product, the dough, not being a sponge, requiring substantially no fermentation in bulk, comprising the steps of: mechanically mixing the dough in a batch; imparting energy to the dough by said mixing step in a quantity in excess of 10 watt hours per kilogramme of total dough ingredients; controlling the temperature rise in the dough resulting from energy input during said mixing step, by passing a fluid coolant through a jacket surrounding the mixing chamber so that the temperature of the dough after mixing is within the range of 25° C. to 35° C.; adding at least some of the water required to make the dough part way through the mixing process; and carrying out at least part of the mixing under vacuum conditions.

2. A method of mixing dough according to claim 1, wherein the energy imparted to the dough by said mixing step is in excess of 15 watt hours per kilogramme of total dough ingredients.

3. A method of mixing dough for use in the production of bread having a specific volume of about 4.5 to 7.0 cubic centimeters per gramme, the dough comprising at least the ingredients flour, salt, yeast, sugar, conditioners and water, and wherein energy added during mixing is sufficient to substantially determine the cell structure of the finished product, the dough, not being a sponge, requiring substantially no fermentation in bulk, comprising the steps of: mechanically mixing the dough in a batch; imparting energy to the dough by said mixing step in a quantity in excess of 10 watt hours per kilogramme of total dough ingredients; initiating and completing said mixing step in less than 7 minutes; controlling the temperature rise in the dough resulting from energy input during said mixing step, by passing a fluid coolant through a jacket surrounding the mixing chamber so that the temperature of the dough after mixing is within the range of 25° C. to 35° C.; adding at least some of the water required to make the dough part way through the mixing process and carrying out at least part of the mixing under vacuum conditions.

4. A method of mixing dough according to claim 3, wherein the energy imparted to the dough by said mixing step is in excess of 15 watt hours per kilogramme of total dough ingredients.

5. A method of mixing dough according to claim 1, wherein at least 5% by weight of the total water is added part way through the mixing process.

6. A method of mixing dough according to claim 1, wherein at least 5% by weight of all the ingredients is added part way through the mixing process.

7. A method of mixing dough according to claim 5, wherein between 5% and 20% by weight of all the ingredients is added part way through the mixing process.

8. A method of mixing dough according to claim 1, wherein the ingredients include fat and at least one of the ingredients sugar and fat is also added part way through the mixing process.

9. A method of mixing dough according to claim 1, wherein said at least some of the water is added after at least 5% of the total mixing time in the mixing chamber.

10. A method of mixing dough according to claim 9, wherein said at least some of the water is added after between 5% and 25% of the total mixing time in the mixing chamber.

11. A method of mixing dough according to claim 3, wherein at least 5% by weight of the total water is added part way through the mixing process.

12. A method of mixing dough according to claim 3, wherein at least 5% by weight of all the ingredients is added part way through the mixing process.

13. A method of mixing dough according to claim 12, wherein between 5% and 20% by weight of all the ingredients is added part way through the mixing process.

14. A method of mixing dough according to claim 3, wherein the ingredients include fat and at least one of the ingredients sugar and fat is also added part way through the mixing process.

15. A method of mixing dough according to claim 3, wherein said at least some of the water is added after at least 5% of the total mixing time in the mixing chamber.

16. A method of mixing dough according to claim 15, wherein said at least some of the water is added after between 5% and 25% of the total mixing time in the mixing chamber.

* * * * *